US008706637B2

(12) United States Patent
Andersson et al.

(10) Patent No.: US 8,706,637 B2
(45) Date of Patent: Apr. 22, 2014

(54) ALLOWING CONVERSION OF ONE DIGITAL RIGHTS MANAGEMENT SCHEME TO ANOTHER

(75) Inventors: Stefan Andersson, Klågerup (SE); Bo Larsson, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1692 days.

(21) Appl. No.: 10/559,027

(22) PCT Filed: Apr. 14, 2004

(86) PCT No.: PCT/EP2004/003906
§ 371 (c)(1),
(2), (4) Date: Nov. 30, 2005

(87) PCT Pub. No.: WO2004/111804
PCT Pub. Date: Dec. 23, 2004

(65) Prior Publication Data
US 2006/0265441 A1    Nov. 23, 2006

Related U.S. Application Data

(60) Provisional application No. 60/513,427, filed on Oct. 22, 2003.

(30) Foreign Application Priority Data

Jun. 6, 2003 (EP) .................................... 03076939
Oct. 15, 2003 (EP) .................................... 03023093

(51) Int. Cl.
*G06F 21/00* (2013.01)

(52) U.S. Cl.
USPC ................................. 705/59; 705/52; 726/27

(58) Field of Classification Search
USPC ....................................................... 705/50–79
See application file for complete search history.

(56) References Cited

U.S. PATENT DOCUMENTS 5,761,669 A * 6/1998 Montague et al. ........ 707/103 R
6,999,948 B1 * 2/2006 Hatanaka et al. .............. 705/65
(Continued)

FOREIGN PATENT DOCUMENTS

EP        1 316 900 A2    6/2003
JP        2003-228636 A   8/2003
(Continued)

OTHER PUBLICATIONS

Muller, "Desktop Encyclopedia of the Internet", 1999, Artech House Inc., Norwood, MA, all pages.*

(Continued)

*Primary Examiner* — Jacob C. Coppola
(74) *Attorney, Agent, or Firm* — Myers Bigel Sibley & Sajovec, PA

(57) ABSTRACT

A method of providing information about supported digital rights management features in relation to an electronic communication device includes providing a reference to listings, or listings, of digital rights management features supported by at least two different digital rights management schemes related to the communication device, and transmitting the reference to the listings, or the listings, to a content provider. An electronic communication device for communication with a content provider, a system for managing digital rights, and related computer program products are also described.

5 Claims, 3 Drawing Sheets

(56) References Cited

U.S. PATENT DOCUMENTS

| | | | |
|---|---|---|---|
| 2002/0026424 A1* | 2/2002 | Akashi | 705/57 |
| 2002/0026445 A1 | 2/2002 | Chica et al. | 707/100 |
| 2002/0029199 A1* | 3/2002 | Go et al. | 705/51 |
| 2002/0029347 A1* | 3/2002 | Edelman | 713/193 |
| 2003/0046274 A1 | 3/2003 | Erickson et al. | 707/3 |
| 2003/0074569 A1* | 4/2003 | Yamauchi et al. | 713/189 |
| 2003/0103528 A1* | 6/2003 | Kawaguchi et al. | 370/468 |
| 2003/0126086 A1 | 7/2003 | Safadi | |
| 2003/0174838 A1* | 9/2003 | Bremer | 380/270 |
| 2004/0003281 A1* | 1/2004 | Sonoda et al. | 713/200 |
| 2004/0179691 A1* | 9/2004 | Hori et al. | 380/277 |
| 2005/0022025 A1* | 1/2005 | Hug | 713/201 |
| 2005/0065891 A1* | 3/2005 | Lee et al. | 705/59 |
| 2005/0209972 A1* | 9/2005 | Bjorkengren et al. | 705/57 |
| 2005/0216763 A1* | 9/2005 | Lee et al. | 713/200 |
| 2007/0266441 A1* | 11/2007 | Kim et al. | 726/26 |

FOREIGN PATENT DOCUMENTS

| | | | | |
|---|---|---|---|---|
| JP | 2003-345707 A | 12/2003 | | |
| JP | 2004-030374 A | 1/2004 | | |
| WO | WO 02/19134 A1 | 3/2002 | | G06F 15/173 |
| WO | WO 2004/111804 A3 | 12/2004 | | |

OTHER PUBLICATIONS

Gralla, "How the Internet Works", Millennium Edition, 1999, Que Corporation, Indianapolis, IN, all pages.*

White, "How Computers Work", Millennium Edition, 1999, Que Corporation, Indianapolis, IN, all pages.*

Derfler, "How Networks Work", Bestseller Edition, 1996, Ziff-Davis Press, Emeryville, CA, all pages.*

Summary of the JP office action dated Jul. 14, 2010, JP Patent Application No. 2006-508148, 4 pages.

* cited by examiner

ALLOWING CONVERSION OF ONE DIGITAL RIGHTS MANAGEMENT SCHEME TO ANOTHER

RELATED APPLICATIONS

The present application is a 35 U.S.C. §371 national phase application of PCT International Application No. PCT/EP2004/003906, having an international filing date of Mar. 4, 2004 and claiming priority to European Patent Application No. 03076939.2, filed Jun. 6, 2003, European Patent Application No. 03023093.2, filed Oct. 15, 2003, and U.S. Provisional Application No. 60/513,427 filed Oct. 22, 2003 the disclosures of which are incorporated herein by reference in their entireties. The above PCT International Application was published in the English language and has International Publication No. WO 2004/111804 A2.

TECHNICAL FIELD OF THE INVENTION

The present invention relates to the field of capability negotiation in relation to digital rights management and more particularly to a method, a computer program product, a computer program element and a computer data signal providing information about supported digital rights management features in relation to an electronic communication device, such an electronic communication-device, a method, a content providing device, a computer program product and a computer program element for generating rights objects for provision to an electronic communication device as well as a system for managing digital rights.

DESCRIPTION OF RELATED ART

There is a trend within the field of tele- and computer communication to be able to download content, for instance different types of media content like music, from different content providers. In this regard it is necessary that the content is used according to the conditions set out by the content provider. In order to do this the content is often encrypted and provided with a rights object setting out the terms for the use of the content in question. A user might for instance be allowed to play a piece of music a fixed number of times or within a specified time limit.

One environment in which this can take place is set out for the area of mobile phones by OMA (Open Mobile Alliance), which are setting up a DRM (Digital Rights Management) scheme, OMA DRM, for handling of such rights objects. This scheme sets out a number of supported features, which allows a user to download content and use the content on a device to which the content was downloaded under the conditions set out by the content provider.

There are however more such schemes existing for other types of devices. For instance memory sticks from the company Sony, use another scheme called Magic Gate.

It is furthermore foreseeable that the user of a device, like a mobile phone, which has downloaded the content, would like to move the content to another device for various reasons. In order to do this the phone might have the possibility to plug in for instance a memory stick onto which the content can be transferred, which memory stick could then be used in another device, which might have a better capability to reproduce the content than the phone. The memory stick might then support another digital rights management scheme and the device to which the stick is to be placed might even support a third scheme.

In order to safeguard the interests of the content provider it is necessary to convert the rights object of the scheme of the phone to a rights object of the memory stick. This is however not a simple task. Since the schemes might support different features, there is a strong risk that the rights object cannot be converted because the first rights object has a feature specified, which is not present in the scheme of the new rights object. This leads to the content being locked to the use in the phone, which is a big disadvantage from the point of view of the user.

At the same time it is not feasible to burden the content provider with the task of keeping track of all the different schemes that can exist for various types of devices and the features these different schemes support.

There is therefore a need to be able to provide a way that allows conversion of content rights from one digital rights management scheme to at least one other scheme without unduly burdening the content provider so that a user can get a higher degree of freedom of where the content is used while at the same time ensuring that the interest interests of the content provider are safeguarded.

SUMMARY OF THE INVENTION

The present invention is thus directed towards solving the problem of allowing conversion of content rights from one digital rights management scheme to at least one other scheme without unduly burdening a content provider so that a user can get a higher degree of freedom of where the content is used while at the same time ensuring that the interests of the content provider are safeguarded.

This problem is solved by providing at least a reference to listings or listings of digital rights management features supported by each of a number of different digital rights management schemes related to a communication device and transmitting at least the reference to listings or the listings of each scheme to a content provider.

One object of the present invention is thus to provide a method of providing information about supported digital rights management features in relation to an electronic communication device that allows conversion of content rights from one digital rights management scheme to at least one other scheme without unduly burdening a content provider so that a user can get a higher degree of freedom of where the content is used while at the same time ensuring that the interests of the content provider are safeguarded.

According to a first aspect of the present invention, this object is achieved by a method of providing information about supported digital rights management features in relation to an electronic communication device comprising the steps of:
  providing at least a reference to listings or listings of digital rights management features supported by each of at least two different digital rights management schemes related to the communication device, of which one listing can be remotely associated with the device, and
  transmitting at least the reference to the listings or the listings of each scheme to a content provider.

A second aspect of the present invention is directed towards a method including the features of the first aspect, wherein each listing is provided in a format allowing automatic generation of rights objects according to a first of the digital rights management schemes.

A third aspect of the present invention is directed towards a method including the features of the first aspect, wherein the step of providing a reference to listings or of providing listings comprises providing a reference to listings or providing listings of all digital rights management features supported by each digital rights management scheme.

A fourth aspect of the present invention is directed towards a method including the features of the first aspect, wherein the step of providing a reference to or providing listings comprises providing a reference to or list only all digital rights management features common to at least two digital rights management schemes.

A fifth aspect of the present invention is directed towards a method including the features of the first aspect, further comprising sending a request for content to the content provider, which may include at least said reference to or said listings.

A sixth aspect of the present invention is directed towards a method including the features of the fifth aspect, further comprising the steps of generating, by the content provider, a rights object according to one of the schemes for the requested content only including features common to the schemes and sending said rights object to the communication device.

A seventh aspect of the present invention is directed towards a method including the features of the sixth aspect, further comprising the step of retrieving the listings, by the content provider, from a location indicated by the reference.

An eighth aspect of the present invention is directed towards a method including the features of the sixth aspect, further comprising the steps of receiving the rights object in the communication device and converting said object to an object according to another of said schemes.

Another object of the present invention is to provide a method of generating rights objects for provision to an electronic communication device that allows conversion of content rights from one digital rights management scheme to at least one other scheme by a content provider without unduly burdening the content provider so that a user can get a higher degree of freedom of where the content is used while at the same time ensuring that the interests of the content provider are safeguarded.

According to a ninth aspect of the present invention, this object is achieved by a method of generating rights objects for provision to an electronic communication device comprising the steps of:
  receiving, from said electronic communication device, at least a reference to listings or listings of digital rights management features supported by each of at least two digital rights management schemes related to the communication device, of which one listing can be remotely associated with said communication device, and
  generating a rights object according to one of the schemes only including features common to all the schemes.

Another object of the present invention is to provide an electronic communication device for communication with a content provider that allows conversion of content rights from one digital rights management scheme to at least one other scheme without unduly burdening the content provider so that a user can get a higher degree of freedom of where the content is used while at the same time ensuring that the interests of the content provider are safeguarded.

According to a tenth aspect of the present invention, this object is achieved by an electronic communication device for communication with a content provider and comprising:
  a digital rights management control unit arranged to provide at least a reference to listings or listings of digital rights management features supported by each of at least two different digital rights management schemes related to the communication device, of which one listing can be remotely associated with the device, and
  a transmitting unit arranged to transmit at least the reference to the listings or the listings of each scheme to a content provider.

An eleventh aspect of the present invention is directed towards an electronic communication device including the features of the tenth aspect, wherein each listing is provided in a format allowing automatic generation of rights objects according to a first of the digital rights management schemes.

A twelfth aspect of the present invention is directed towards an electronic communication device including the features of the tenth aspect, wherein the digital rights management control unit is arranged to, when providing a reference to listings or the listings, provide listings or references to listings comprising all digital rights management features supported by each digital rights management scheme.

A thirteenth aspect of the present invention is directed towards an electronic communication device including the features of the tenth aspect, wherein the digital rights management control unit is arranged to, when providing a reference to listings or listings, provide a reference to or list only all digital rights management features common to at least two digital rights management schemes.

A fourteenth aspect of the present invention is directed towards an electronic communication device including the features of the tenth aspect, wherein the digital rights management control unit is arranged to send a request, via the transmitting unit, for content to the content provider, which request may include at least the reference to said lists or said lists.

A fifteenth aspect of the present invention is directed towards an electronic communication device including the features of the tenth aspect, further comprising a first fixed media content store with which a first digital rights management scheme is associated.

A sixteenth aspect of the present invention is directed towards an electronic communication device including the features of the fifteenth aspect, further comprising a removable media content store with which a second digital rights management scheme is associated.

A seventeenth aspect of the present invention is directed towards an electronic communication device including the features of the tenth aspect, wherein it is a portable communication device.

An eighteenth aspect of the present invention is directed towards an electronic communication device including the features of the seventeenth aspect, wherein it is a mobile phone.

Another object of the present invention is to provide a system for managing digital rights that allows conversion of content rights from one digital rights management scheme to at least one other scheme without unduly burdening a content provider so that a user can get a higher degree of freedom of where the content is used while at the same time ensuring that the interests of the content provider are safeguarded.

According to a nineteenth aspect of the present invention, this object is achieved by a system for managing digital rights comprising:
  an electronic communication device for communication with a content provider and comprising:
    a digital rights management control unit arranged to provide at least a reference to listings or listings of digital rights management features supported by each of at least two different digital rights management schemes related to the communication device, of which one listing can be remotely associated with the device, and a transmitting unit arranged to transmit at least the reference to listings or the listings of each scheme to a content provider, and a content providing device for providing media content to electronic communication devices arranged to:

receive at least said reference to listings or said listings from the device, and generate a rights object according to one of the schemes only including features common to all the schemes.

Another object of the present invention is to provide a content providing device for generating rights objects to electronic communication devices that allows conversion of content rights from one digital rights management scheme to at least one other scheme without unduly burdening the content providing device so that a user can get a higher degree of freedom of where the content is used while at the same time ensuring that the interests of the content provider are safeguarded.

According to a twentieth aspect of the present invention, this object is achieved by a content providing device for generating rights objects to electronic communication devices and arranged to:

receive, from an electronic communication device, at least a reference to listings or listings of digital rights management features supported by each of at least two different digital rights management schemes related to a communication device, of which one listing can be remotely associated with said communication device, and generate a rights object according to one of the schemes only including features common to all the schemes.

Another object of the present invention is to provide a computer program product for providing information about supported digital rights management features in relation to an electronic communication device that allows conversion of content rights from one digital rights management scheme to at least one other scheme without unduly burdening a content provider so that a user can get a higher degree of freedom of where the content is used while at the same time ensuring that the interests of the content provider are safeguarded.

According to a twenty-first aspect of the present invention, this object is achieved by a computer program product, for providing information about supported digital rights management features in relation to an electronic communication device comprising a computer readable medium having thereon:

computer program code means, to make the electronic communication device execute, when said program is loaded in the electronic communication device:

provide at least a reference to listings or listings of digital rights management features supported by each of at least two different digital rights management schemes related to the electronic communication device, of which one listing can be remotely associated with the device, and order transmission of at least the reference to listings or the listings of each scheme to a content provider.

Another object of the present invention is to provide a computer program element for providing information about supported digital rights management features in relation to an electronic communication device that allows conversion of content rights from one digital rights management scheme to at least one other scheme without unduly burdening a content provider so that a user can get a higher degree of freedom of where the content is used while at the same time ensuring that the interests of the content provider are safeguarded.

According to a twenty-second aspect of the present invention, this object is achieved by a computer program element, for providing information about supported digital rights management features in relation to an electronic communication device, having:

computer program code means, to make the electronic communication device execute, when said program element is loaded in the electronic communication device:

provide at least a reference to listings or listings of digital rights management features supported by each of at least two different digital rights management schemes related to the electronic communication device, of which one listing can be remotely associated with the device, and order transmission of at least the reference to listings or the listings of each scheme to a content provider.

Another object of the present invention is to provide a computer program product for generating rights objects for provision to an electronic communication device that allows conversion of content rights from one digital rights management scheme to at least one other scheme without unduly burdening a content provider so that a user can get a higher degree of freedom of where the content is used while at the same time ensuring that the interests of the content provider are safeguarded.

According to a twenty-third aspect of the present invention, this object is achieved by a computer program product for generating rights objects for provision to an electronic communication device comprising a computer readable medium having thereon:

computer program code means, to make a computer execute, when said program is loaded in the computer:

upon reception from said electronic communication device of at least a reference to listings or listings of digital rights management features supported by each of at least two different digital rights management schemes related to the communication device, of which one listing can be remotely associated with said communication device, to generate a rights object according to one of the schemes only including features common to all the schemes.

Another object of the present invention is to provide a computer program element for generating rights objects for provision to an electronic communication device that allows conversion of content rights from one digital rights management scheme to at least one other scheme without unduly burdening a content provider so that a user can get a higher degree of freedom of where the content is used while at the same time ensuring that the interests of the content provider are safeguarded.

According to a twenty-fourth aspect of the present invention, this object is achieved by a computer program element for generating rights objects for provision to an electronic communication device, having:

computer program code means, to make a computer execute, when said program element is loaded in the computer:

upon reception from said electronic communication device of at least a reference to listings or listings of digital rights management features supported by each of at least two different digital rights management schemes related to the communication device, of which one listing can be remotely associated with said communication device, to generate a rights object according to one of the schemes only including features common to all the schemes.

Another object of the present invention is to provide a computer data signal for providing information about supported digital rights management features in relation to an electronic communication device that allows conversion of content rights from one digital rights management scheme to at least one other scheme without unduly burdening a content provider so that a user can get a higher degree of freedom of where the content is used while at the same time ensuring that the interests of the content provider are safeguarded.

According to a twenty-fifth aspect of the present invention, this object is achieved by a computer data signal for providing information about supported digital rights management features in relation to an electronic communication device comprising:

at least a reference to listings or listings of digital rights management features supported by each of at least two different digital rights management schemes related to the electronic communication device, of which one can be remotely associated with the device.

The invention has the following advantages. It allows conversion of content rights from one digital rights management scheme to at least one other scheme, which gives a user of the content additional freedom of movement of the content between different devices. The content provider does also not have to keep track of what features different schemes support, since this is provided to him. The content provider does furthermore directly see if these features are sufficient for protecting his interests. The content provider can furthermore guarantee to the user that a feature selected for inclusion in a rights object can be handled by the electronic communication device and other devices associated with it. Since listings, according to the second and eleventh aspect of the invention, are provided in a format allowing automatic generation of rights objects according to a first of the digital rights management schemes, the content provider does not have to know about more than one scheme, while still being able to provide content to a user who needs to use the content with different schemes. The provision of different listings for each scheme according to the third and twelfth aspect furthermore gives the content provider the possibility to decide for himself if the content is to be provided to a user of the phone or not and in what degree it is to be allowed to be used on other devices than the phone having other schemes.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
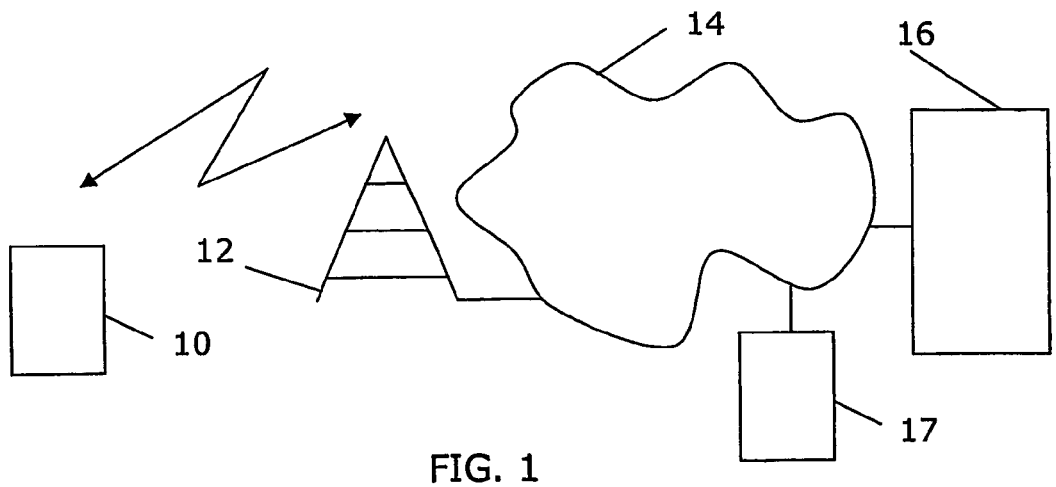
FIG. 1 shows a block schematic of a system according to the invention including an electronic communication device and a content providing device according to the invention.

A system according to the invention will now be described in relation to FIG. 1. An electronic communication device in the form of a mobile phone 10 is communicating with a content providing device 16 via a cellular network 14 having a base station 12. To the network 14 is also connected a server 17, on which is stored information about DRM (Digital Rights Management) schemes that the phone supports. The phone 10 downloads content from the content providing device 16, which can be in the form of different types of media files, like video, sound or still pictures according to different types of formats that the phone can handle. When the user downloads this content it is provided together with a rights object, which among other things define in what way the user is allowed to use the content. The user of the phone might however want to transfer the downloaded content to other devices that he owns, which cannot be readily done, since the rights object is specific for the scheme used and cannot be converted to a rights object associated with the other device unless all the features of the rights object of the scheme of the device are supported by the rights object of the scheme of the other device.

Figure 2:
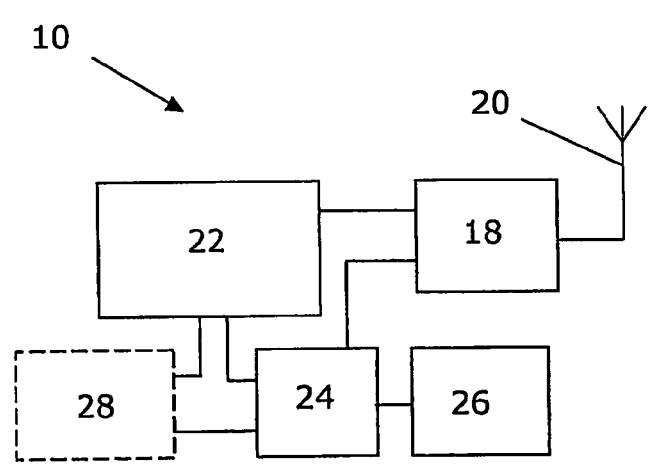
FIG. 2 shows a block schematic of an electronic communication device according to the Invention.

In order to allow such a conversion the phone includes the units of FIG. 2, which figure shows a block schematic of relevant parts of the phone and to which figure reference is now being made. The phone thus includes a transmitting unit 18 arranged to communicate with the network of FIG. 1 via an antenna 20. The transmitting unit 18 is connected to at digital rights management control unit 22 and to a first fixed media content store 24. An application unit 26 is connected to the media content store 24 in order for the user of the device to be able to use content that has been downloaded to the first fixed media content store 24. A second removable media content store 28 is connected to the first fixed media content store 24. A first digital rights management scheme is associated with the phone. Since the content is to be downloaded into the fixed media content store 24, the first scheme can be seen as being associated with this store 24. A second digital rights management scheme is associated with the second removable media store, which in this embodiment is a memory stick. The digital rights management control unit 22 is connected to both these stores 24 and 28. It should be understood that the phone 10 includes many other and more units than the ones described in order to make and receive phone calls and to perform other functions not related to downloaded content. They are however not related to the present invention and have therefore been omitted for easier understanding of the invention. The way the different media content stores, application unit, communication unit and digital rights management unit are interconnected and described above is just an example of how the invention can be implemented. It should be realised that the configuration and the functions can be modified and varied in many ways.

Figure 3:
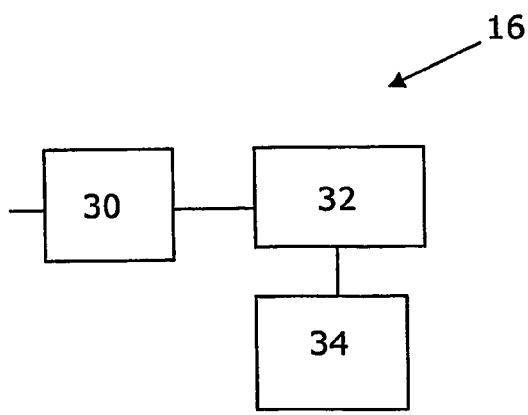
FIG. 3 shows a block schematic of a content providing device according to the Invention, FIG. 4 schematically shows the sending of a request for content from the electronic communication device and the delivery of the requested content from the content providing device.

FIG. 3 shows a block schematic of the relevant part of the content providing device 16 according to the invention. This includes a communication unit 30, a content provision control unit 32 and a content store 34. The content provision control unit 32 is connected to both the communication unit 30 and the content store 34.

Figure 4:
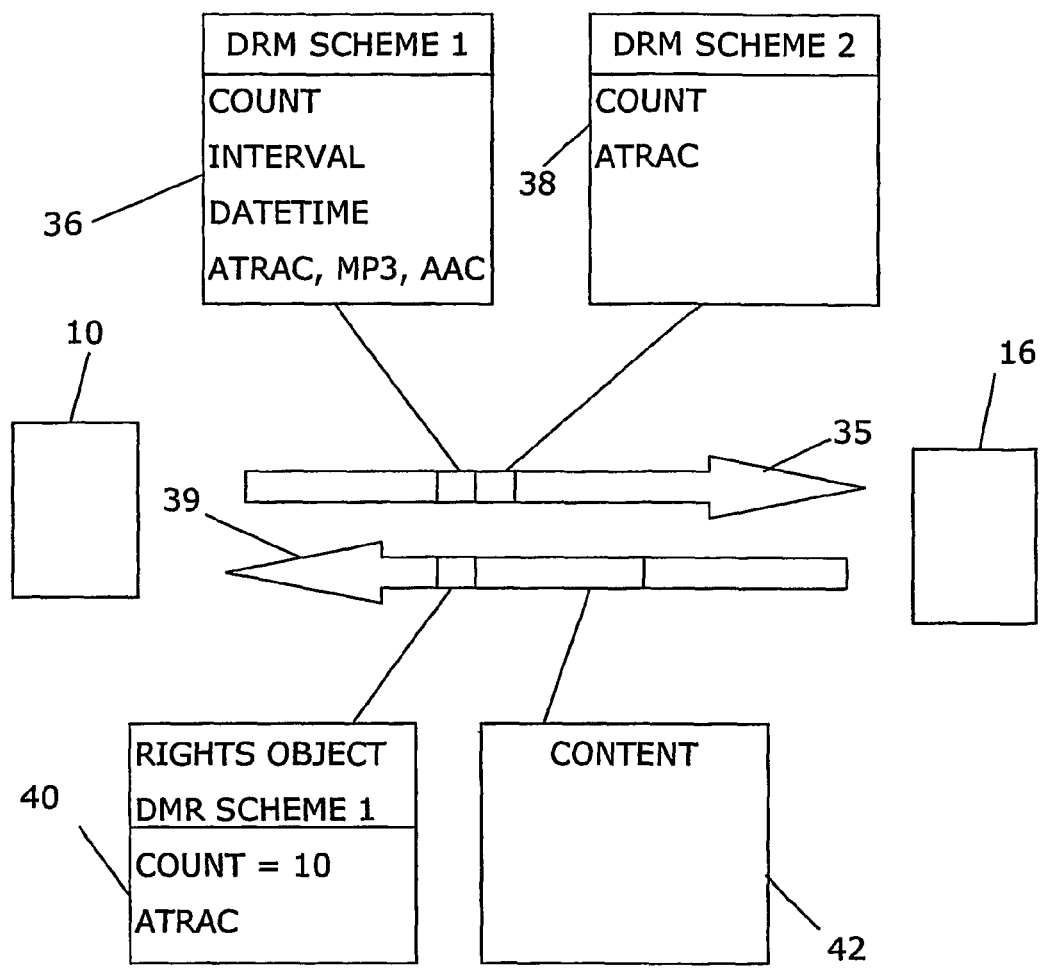
Figure 5:
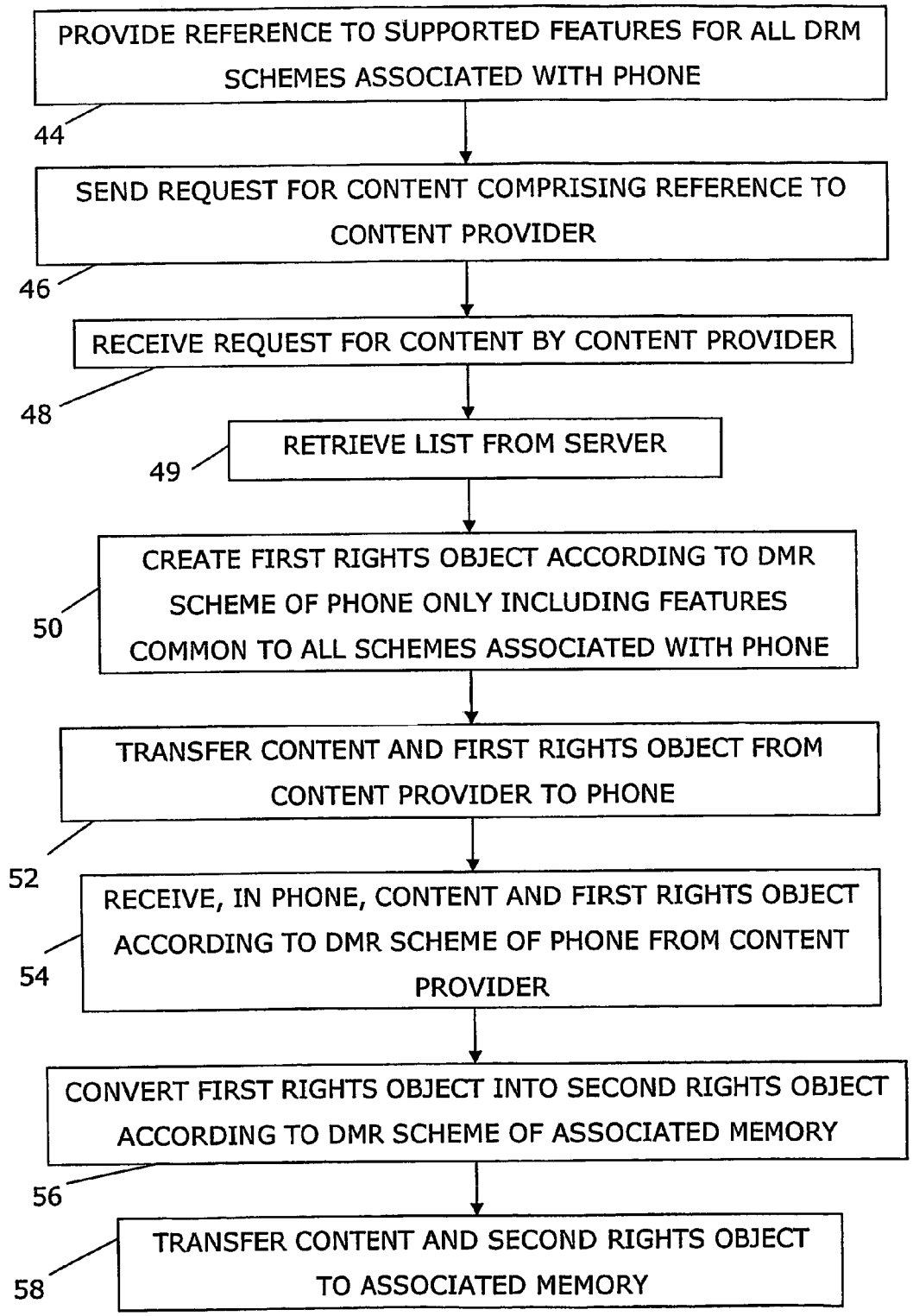
FIG. 5 shows a flow chart of a method of providing information about supported digital rights management schemes as well as receiving content according to the invention, and FIG. 6 schematically shows a computer program product according to the Invention in the form of a CD Rom disc.

The functioning of the system will now be described, starting with the functionality of the phone. This functioning will be described with reference being made to FIGS. 1, 2, 3, 4 and 5, where FIG. 4 schematically shows a request signal 35 for content including a first list 36 associated with a first DRM scheme listing a number of features of that scheme (Count, Interval, Datetime, ATRAC, MP3, AAC) and a second list 38 associated with a second DRM scheme listing a number features of that scheme (Count, ATRAC) that is sent from the phone 10 to the content provider. For simplifying the understanding of the invention, FIG. 4 shows the lists as being sent in the request for content. In reality the signal would only include a reference to the lists, which are provided on the server 17. FIG. 4 also schematically shows a reply signal 39 including a piece of content 42 provided by the content provider together with a rights object 40 according to a scheme having two features used, where the feature count is set to 10, and the coding used is ATRAC. The reply signal 39 is sent from the content provider 16 to the phone 10. FIG. 5 shows a flow chart of a method according to the invention performed in the phone 10 and the content provider.

The method starts with a user wanting to download some type of media content from a content provider to which the content providing device belongs. Such selections are being made using user input units like a keypad, which the digital rights management control unit reads. The phone knows beforehand what different types of digital rights management schemes are supported. When the user thus wants to download some content, the digital rights management control unit 22 already knows the schemes the phone supports, both in itself or through the second removable content store 28. An example of a list of a scheme that the removable content store 28 supports is shown in FIG. 4, designated as 38. The list is here exemplified for the Magic Gate scheme and here the features "count", which is used for indicating how many times a content can be replayed is shown as well as feature ATRAC (Adaptive Transform Acoustic Coding), which indicates what type of coding can be used for the content when stored on the second store 28. It should be noted that these are just examples of the type of features supported and that in reality several more can be supported by this scheme. However the list includes all the features supported by the store 28 including possible optional ones. The digital rights management control unit 22 also knows which scheme the phone itself supports, of which a list for this first scheme 36 of the features supported by the phone, which is here exemplified by the OMA DRM scheme is also shown in FIG. 4. The scheme here supports the features count, which is the same as was mentioned previously, the feature interval, which is used for indicating a time interval within which the content can be replayed and normally an interval without a fixed starting date, date time indicating a fixed time interval within which the content can be replayed as well as the different type of codings supported ATRAC, MP3 and AAC. Also here the list 36 includes all the features supported by the scheme including possible optional ones, but for easier understanding of the invention only a few are shown in FIG. 4. It should be noted that these files or lists do not indicate the details of the schemes, but just indicates the different features that each scheme supports. Both the lists are furthermore provided in the form of the syntax used in rights objects provided in the first scheme. The advantage of this will be explained later on. When the first scheme is OMA DRM, this means that the features are provided as parameter values used in the OMA Rights Expression Language vocabulary using parameters defined in UAProf (User Agent Profile). In the preferred embodiment these lists are provided as documents on the server 17, which is provided by the phone manufacturer. The phone then provides or includes a reference or link, for instance using a URL, to these lists on the server 17. The method is thus started by providing a reference to the lists of features for all DRM schemes associated with the phone, step 44.

After having provided this reference to the two lists 36 and 38 the digital rights management control unit 22 sends a request signal 35 to the content providing device 16 using the transmission unit 18, step 46. This request is a request for a piece of content together with the reference to the two lists 36 and 38 of the features supported by the phone 10 and the removable store 28. The lists are stored on the server 17 as expressed in terms used by the first scheme. Thereafter the content provider 16 receives the request for content 35, step 48, in the communication unit 30, which forwards the request to the content provision control unit 32. The content provision control unit 32 then retrieves the lists from the server 17 using the reference received from the phone, step 49, and creates or generates a rights object 40 for the content, step 50. A rights object is preferably provided in the form of an XML-file. This rights object is created according to the first scheme, i.e. the scheme of the phone and only includes features supported by both the schemes. Since the features are listed using the syntax for rights objects according to the first scheme, it is easy for the content provider to generate such a rights object automatically. In the simplified example given above the rights object 40 only has two features, where a first "count" has been set to 10, i.e. the user is allowed to replay the content 10 times and with the feature ATRAC set, i.e. the coding used is ATRAC. The content provision control unit 32 then retrieves the content 40 from the content store 34 possibly encrypted and otherwise performs encryption of the content. The content 42 and the content rights 42 are then transferred in a reply signal 39 from the content provider 16 to the phone 10, step 52, using the communication unit 30. Here the content may be encrypted and the phone receives decryption keys in some suitable manner in order to be able to actually replay the content. In a preferred embodiment the keys for such decryption are provided in the rights object 40. The content and the rights object were provided together to the phone in the embodiment described above. It should however be realised that they can just as well be provided separately.

The content 42 and the rights object 40 are then received by the transmitting unit 18 of the phone 10 and then stored in store 24 under the control of the digital rights management control unit 22, step 54. In this way the application unit 26 can replay the content.

Now suppose that the user wants to replay the content somewhere else, like for instance on his stereo. He then wants to move the content to the removable store 28. In order to do this the digital rights management control unit 22 converts the rights object to a rights object according to the scheme 38 supported by the removable store 28, step 56. Thereafter the content and the new rights object are transferred to removable store 28, which can now be disconnected from the phone and brought to for instance a stereo, video or a computer, step 58. In this way the user can freely move the content from one device to another, while the interest of the content provider are ensured.

The different control units are preferably provided in the form of one or more processors with associated program memories, which perform the various method steps according to the invention. The stores are preferably provided as normal memories. The communication units are preferably provided in the form of normal communication circuits, like for instance ASIC circuits.

Figure 6:
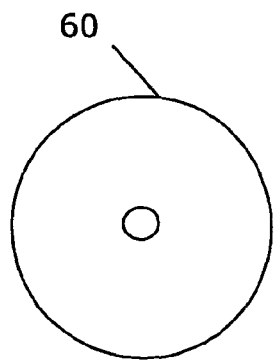

The program code for performing the invention can also be provided on one or more data carrier, which performs the invention when loaded into the phone or the content providing device, of which one type, a CD ROM disc 60, is shown in FIG. 6. This is just an example of one such data carrier. Other types are just as well feasible like for instance memory sticks. The program code might furthermore also be downloaded into either the phone or the content provider server or both from an external server.

The present invention has a number of advantages. It allows conversion of content rights from one digital rights management scheme to at least one other scheme, which gives a user of the content additional freedom of movement of the content between different devices. The content provider does also not have to keep track of what features different schemes support, since this information is provided to him. The content provider does furthermore directly see if these features are sufficient for protecting his interests. The content provider can also guarantee to the user that a feature selected for inclusion in a rights object can be handled by the electronic communication device and other devices associated with it. Since two lists having features set out according to the syntax used for rights objects according to the first scheme are provided, the content provider does not have to know about more than one scheme, while still being able to provide content to a user who needs to use the content with different schemes. The use of a syntax according to the first scheme also allows the content provider to generate a rights object automatically. The provision of the different lists furthermore gives the content provider the possibility to decide for himself if the content is to be provided to as user of the phone or not and in what degree it is to be used on other devices than the phone.

There are a number of variations of the invention that are possible. It is possible that the phone downloads further capabilities and applications, in this case the phone can include additional information, like a DIF-header, in the request sent to the content providing device, which additional information could then include information about the additional capabilities of the phone. The phone could furthermore itself be provided with both or one of the lists and send it or them directly to the content providing device. It is furthermore possible that either the phone or the server provides a list of features that are common or only supported by both DRM schemes. This would relieve the content provider from some of the burden of checking what features both support, but also limits the options to delivering the content or not. It is also possible that a list is provided also for third equipment, like for instance a video, stereo or computer to which the memory stick is to be inserted. Information about schemes for other devices might then be received directly from the device, like for instance via Bluetooth™. Such information can also be received from other devices such as a manufacturer of the device, which also applies for the removable store. In general the invention is thus not limited to two lists but can be applied for more than one, where the only limitation is the limited memory space of the phone. The invention was furthermore presented in relation to mobile phones. It should however be realised that it can be provided on several other types of devices, such as communicators, electronic organizers, smartphones, palm top computers, lap top computers or even on PCs. Similarly the communication network used need not be a cellular network, but can be any suitable communication network. Thus the present invention is only to be limited by the following claims.

The invention claimed is:

1. A method of providing information about supported digital rights management features in relation to an electronic communication device, comprising:
   a first electronic communication device providing information associated with listings of digital rights management features supported by at least two different digital rights management schemes related to the first electronic communication device, wherein a first scheme of the at least two different digital rights management schemes includes at least one feature not found in a second scheme of the at least two digital rights management schemes, wherein at least the second scheme is also related to a second electronic device associated with the first electronic communication device;
   the first electronic communication device transmitting the information associated with the listings to a content provider device;
   the first electronic communication device sending a request for content to the content provider device, which request includes the information associated with the listings;
   generating, by the content provider device, a first rights object according to the first scheme for using the requested content, wherein the first rights object includes features common to the at least two digital rights management schemes, wherein the first rights object includes only digital rights features common to each scheme of the at least two different digital rights management schemes, and sending the first rights object to the first electronic communication device; and
   receiving the first rights object in the first electronic communication device, converting the first rights object to a second rights object according to the second scheme, and sending the second rights object to the second electronic device.

2. A method according to claim 1, wherein each listing is provided in a format allowing automatic generation of rights objects according to a first of the digital rights management schemes.

3. A method according to claim 1, wherein providing the information associated with the listings, comprises providing information identifying all digital rights management features supported by at least two of the digital rights management schemes.

4. A method according to claim 1, wherein providing the information associated with the listings, comprises providing information identifying only those digital rights management features that are common to at least two of the digital rights management schemes.

5. A method according to claim 1, wherein providing the information associated with the listings of digital rights management features comprises providing a reference to listings of digital rights management features, the method further comprising retrieving the listings, by the content provider, from a location indicated by the reference.

* * * * *

UNITED STATES PATENT AND TRADEMARK OFFICE
CERTIFICATE OF CORRECTION

PATENT NO. : 8,706,637 B2  
APPLICATION NO. : 10/559027  
DATED : April 22, 2014  
INVENTOR(S) : Andersson et al.

It is certified that error appears in the above-identified patent and that said Letters Patent is hereby corrected as shown below:

In the Specification,
Column 2, Line 20: Please correct "that the interest interests of"
to read -- that the interests of --

Signed and Sealed this
Thirtieth Day of December, 2014

Michelle K. Lee
*Deputy Director of the United States Patent and Trademark Office*